(12) United States Patent
Zhang et al.

(10) Patent No.: US 7,158,795 B2
(45) Date of Patent: Jan. 2, 2007

(54) DUMMY PCH BLOCK DETECTION FOR POWER SAVING IN GSM HANDSET

(75) Inventors: Yan Zhang, Nanjing (CN); Jingdong Lin, Irvine, CA (US); Yao Jingjing, Shanghai (CN); Yuan Xu, Shanghai (CN)

(73) Assignee: Spreadtrum Communications Corporation, Sunnyvale, CA (US)

( * ) Notice: Subject to any disclaimer, the term of this patent is extended or adjusted under 35 U.S.C. 154(b) by 138 days.

(21) Appl. No.: 11/006,861

(22) Filed: Dec. 8, 2004

(65) Prior Publication Data

US 2006/0121911 A1   Jun. 8, 2006

(51) Int. Cl.
    *H04M 1/00* (2006.01)
(52) U.S. Cl. .................. 455/452.2; 455/450; 455/574; 455/343.2; 455/426.1; 370/311; 370/478
(58) Field of Classification Search ............. 455/452.2, 455/450, 574, 343.2, 343.5, 426.1, 458; 370/311, 370/478, 321, 328, 329, 337
    See application file for complete search history.

(56) References Cited

U.S. PATENT DOCUMENTS 5,878,036 A    3/1999  Spartz
6,178,337 B1   1/2001  Spartz
6,584,090 B1   6/2003  Abdelgany
6,631,259 B1  10/2003  Pecen
6,714,781 B1   3/2004  Pecen
2001/0023184 A1*  9/2001  Kalveram et al. .......... 455/426
2003/0058820 A1*  3/2003  Spencer et al. ............. 370/332

* cited by examiner

*Primary Examiner*—Lester Kincaid
*Assistant Examiner*—Emem Ekong
(74) *Attorney, Agent, or Firm*—Perkins Coie LLP

(57) ABSTRACT

One of the common channels of the GSM system is the paging channel (PCH) for alerting the mobile station of an incoming call. The PCH message is scattered among four bursts as a result of coding, interleaving, and mapping processes before transmission. It is a waste of power for a handset to turn on and analyze all four bursts if the PCH message is a dummy one. Ideally, a handset needs to be able to make a determination whether a PCH message is a dummy one in as short of a time as possible and, if it is, turn off the power. Embodiments of this invention include methods and apparatus for enabling a handset to make this determination by merely analyzing the first received burst. Since most of the PCH messages are dummy ones, the proposed methods will cause noticeable savings in the power consumption of the GSM handsets.

14 Claims, 15 Drawing Sheets

Figure 5 PCH block channel coding and interleaving

Figure 6 The Dummy PCH block message process

| Byte index | PCH Message | | Information Element(IE) | | | |
|---|---|---|---|---|---|---|
| | Hexadecimal | Binary code | | | | |
| 0 | L | x x x x x 0 1 | L2 Pseudo Length | | | |
| 1 | 06 | 0 0 0 0 0 1 1 0 | Skip indicator | | Protocol Discriminator | |
| 2 | 2T | 0 0 1 0 0 0 0 1 | Paging message | | Paging Request Type1 | |
| 3 | NM | x x x x 0 0 x x | Channel Needed | | Spare | Page Mode |
| length 2–9 | | x x x x x x x x ⋮ x x x x x x x x | Mobile Identity1 (LV1,M2) | | | |
| length 3–10 | | x x x x x x x x ⋮ x x x x x x x x | Mobile Identity2 (TLV,O¹) | | | |
| ... | 2b | 0 0 1 0 1 0 1 1 | P1 Rest Octets | | | |
| ... | ... | ⋮ | | | | |
| 22 | 2b | 0 0 1 0 1 0 1 1 | | | | |

FIG. 3

| Byte index | PCH Message Hexadecimal | PCH Message Binary code | Information element | |
|---|---|---|---|---|
| 0 | L | x x x x x x 0 1 | L2 Pseudo Length | |
| 1 | 06 | 0 0 0 0 0 1 1 0 | Skip indicator | Protocol Discriminator |
| 2 | 2T | 0 0 1 0 0 0 1 0 | Paging message | Paging Request Type2 |
| 3 | NM | x x x x 0 0 x x | Channel Needed | Spare | Page Mode |
| 4~7 (length: 4) | | x x x x x x x x ⋯ x x x x x x x x | Mobile Identity 1 (V,M) | |
| 8~11 (length: 4) | | x x x x x x x x ⋯ x x x x x x x x | Mobile Identity2 (V,M) | |
| length 3~10 | | x x x x x x x x ⋯ x x x x x x x x | Mobile Identity 3 (TLV,O) | |
| Length: 1~11 | xb | x x x 0 1 0 1 1 | P2 Rest Octets | |
| | 2b | ⋯ | | |
| | 2b | 0 0 1 0 1 0 1 1 | | |

*FIG. 4*

| Byte index | PCH Message | | Information element | |
|---|---|---|---|---|
| | Hexadecimal | Binary code | | |
| 0 | L | x x x x x x 0 1 | L2 Pseudo Length | |
| 1 | 06 | 0 0 0 0 0 1 1 0 | Skip indicator | Protocol Discriminator |
| 2 | 2T | 0 0 1 0 0 1 0 0 | Paging message | Paging Request Type3 |
| 3 | NM | x x x x 0 0 x x | Channel Needed | Spare | Page Mode |
| 4~7 (length: 4) | | x x x x x x x x ..... x x x x x x x x | Mobile Identity1 (V,M) | |
| 8~11 (length: 4) | | x x x x x x x x ..... x x x x x x x x | Mobile Identity2 (V,M) | |
| 12~15 (length: 4) | | x x x x x x x x ..... x x x x x x x x | Mobile Identity3 (V,M) | |
| 16~19 (length: 4) | | x x x x x x x x ..... x x x x x x x x | Mobile Identity4 (V,M) | |
| 20~22 Length: 3 | xb | x x x 0 1 0 1 1 | P3 Rest Octets | |
| | 2b | 0 0 1 0 1 0 1 1 | | |
| | 2b | 0 0 1 0 1 0 1 1 | | |

*FIG. 5*

| 8 | 7 | 6 | 5 | 4 | 3 | 2 | 1 | |
|---|---|---|---|---|---|---|---|---|
| | Mobile Identity IEI ||||||| octet 1 |
| Length of mobile identity contents |||||||| octet 2 |
| Identity digit 1 |||| odd/even indic | Type of identity ||| octet 3 |
| Identity digit p+1 |||| Identity digit p |||| octet 4* |

```
Type of identity (octet 3)
Bits
3 2 1
0 0 1    IMSI
0 1 0    IMEI
0 1 1    IMEISV
1 0 0    TMSI
0 0 0    No Identity  note 1)

All other values are reserved.

Odd/even indication (octet 3)
Bit
4
0        even number of identity digits and also when
         the TMSI is used
1        odd number of identity digits Identity digits (octet 3 etc)
For the IMSI, IMEI and IMEISV this field is coded using
BCD coding. If the number of identity digits is even
then bits 5 to 8 of the last octet shall be filled
with an end mark coded as "1111".

If the mobile identity is the TMSI then bits 5 to 8 of
octet 3 are coded as "1111" and bit 8 of octet 4 is the
most significant bit and bit 1 of the last octet the
least significant bit. The coding of the TMSI is left
open for each administration.
```

FIG. 6

| | 1 | 2 | 3 | 4 | 5 | 6 | 7 | 8 | |
|---|---|---|---|---|---|---|---|---|---|
| | 1 spare | 1 spare | 0 spare | 1 spare | 0 spare | 1 spare | 0 spare | 0 spare | octet 1 |
| | 1 spare | 1 spare | 0 spare | 1 spare | 0 spare | 1 spare | 0 spare | 0 spare | octet 2 |
| | ... | ... | ... | ... | ... | ... | ... | ... | |
| | 1 spare | 1 spare | 0 spare | 1 spare | 0 spare | 1 spare | 0 spare | 0 spare | octet n |

*FIG. 7*

| 8 | 7 | 6 | 5 | 4 | 3 | 2 | 1 | |
|---|---|---|---|---|---|---|---|---|
| CNI | CN3 | | 0 spare | 1 spare | 0 spare | 1 spare | 1 spare | octet 1 |
| 0 spare | 0 spare | 1 spare | 0 spare | 1 spare | 0 spare | 1 spare | 1 spare | octet 2* |
| ... | | | | | | | | |
| 0 spare | 0 spare | 1 spare | 0 spare | 1 spare | 0 spare | 1 spare | 1 spare | octet n* |

```
CNI     Channel Needed Indication (octet 2)
Bit 8
  0     No indication is given. The default value to be
        assumed for CN3 is 00 (any channel).
  1     An indication is given in the CN3 field.

CN3     Channel Needed for Mobile Identity 3
Bits    7 6 (octet 2)
The values and semantics used in the CN3 field are those
of the CHANNEL field of Channel Needed IE (see 10.5.2.8).

The CN3 field is associated with the Mobile Identity 3 IE
of the PAGING REQUEST TYPE 2 message.
```

*FIG. 8*

| 8 | 7 | 6 | 5 | 4 | 3 | 2 | 1 | |
|---|---|---|---|---|---|---|---|---|
| CNI | CN3 | | CN4 | | 0 spare | 1 spare | 1 spare | octet 2 |
| 0 spare | 0 spare | 1 spare | 0 spare | 1 spare | 0 spare | 1 spare | 1 spare | octet 3 |
| 0 spare | 0 spare | 1 spare | 0 spare | 1 spare | 0 spare | 1 spare | 1 spare | octet 4 |

```
CNI    Channel Needed Indication (octet 2)
Bit 8
  0    No indication is given. The default value to be
       assumed for CN3 and CN4 is 00 (any channel).
  1    An indication is given in CN3 and CN4 fields.

CN3    Channel Needed for Mobile Identity 3
Bits  7 6 (octet 2)  (see note)
The CN3 field is associated with the Mobile Identity 3 IE
of the PAGING REQUEST TYPE 3 message.

CN4    Channel Needed for Mobile Identity 4
Bits  5 4 (octet 2)  (see note)
The CN4 field is associated with the Mobile Identity 4 IE
of the PAGING REQUEST TYPE 3 message.

NOTE:  The values and semantics used in the CN3 and
       CN4 fields are those of the CHANNEL field of
       Channel Needed IE (see 10.5.2.8).
```

*FIG. 9*

| Byte index | Dummy PCH Message | | Information |
|---|---|---|---|
| | Hexadecimal | Binary code | |
| 0 | 15 | 0001 0101 | Number of Total Byte |
| 1 | 06 | 0000 0110 | Paging Request Type |
| 2 | 21 | 0010 0001 | 'M' is Page Mode (4 kinds) |
| 3 | 0'M' | 0000 0000 0001 0000 0010 0000 0011 | |
| 4 | 01 | 0000 0001 | Number of the left Byte |
| 5 | 'F'0 | 0000 0000 1111 | F=[0 0 0 0] or [1 1 1 1] |
| 6 | 2b | 0010 1011 | Filled byte |
| ... | ... | | |
| | 2b | 0010 1011 | Filled byte |
| ... | ... | | |
| 22 | 2b | 0010 1011 | Filled byte |

*FIG. 10*

| Page Mode M | F | b |
|---|---|---|
| 0 | [0 0 0 0] | [0010000010001101101010100] |
| | [1 1 1 1] | [0111010110100000110000001] |
| 1 | [0 0 0 0] | [0000101101101011100011010] |
| | [1 1 1 1] | [0101111001000110010110011111] |
| 2 | [0 0 0 0] | [1001101011111000011101010] |
| | [1 1 1 1] | [1100111110100011101111111] |
| 3 | [0 0 0 0] | [1011000100011010000001100] |
| | [1 1 1 1] | [1110010000110111101011001] |

*FIG. 11*

Where sum [x==RBurst0($n_x$)] is the total number of the matched pairs after bit-by-bit comparison of the bits of vector x with the corresponding bits of vector RBurst0

The Hard Decision algorithm

The Soft Decision algorithm

DUMMY PCH BLOCK DETECTION FOR POWER SAVING IN GSM HANDSET

The concepts of this invention relate generally to wireless digital communication systems and, in particular, to power-saving techniques for Global System for Mobile Communication (GSM) technology.

BACKGROUND

GSM is a set of ETSI (European Telecommunications Standards Institute) standards specifying the infrastructure for a digital cellular service. Subsequent to its commercial operation in the European countries in 1991, GSM rapidly gained acceptance and market share worldwide. In addition to digital transmission, GSM incorporates many advanced services and features, including ISDN (Integrated Services Digital Network) compatibility and worldwide roaming in other GSM networks. The functional architecture of a GSM system, in general, includes the mobile station (MS), the Base Station subsystem, and the network subsystem. Each of these subsystems comprises functional entities that communicate through various interfaces using specified protocols.

The mobile station in GSM comprises the actual hardware, which is the mobile equipment, and the subscriber information, which includes a unique identifier called the International Mobile Subscriber Identity (IMSI). IMSI is stored in the Subscriber Identity Module (SIM), implemented as a smart card. The SIM card may be placed in any GSM mobile equipment to make and receive calls at that terminal and to receive other subscribed services.

The Base Station Subsystem is composed of the Base Transceiver Station (BTS) and the Base Station Controller (BSC). The BTS houses the radio transceivers that define a cell and handle the radio interface protocols with the mobile station. The BSC manages the radio resources for one or more BTSs and the radio interface channels (setup, tear down, frequency hopping, etc.), as well as the handovers.

The Network Subsystem includes four intelligent databases and the Mobile services Switching Center (MSC), which is central to the Network Subsystem. While acting as a normal switching node of the PSTN (Public Switched Telephone Network) or ISDN, it provides all the functionality needed for handling a mobile subscriber, including registration, authentication, location updating, inter-MSC handovers, and call routing to a roaming subscriber. The MSC also provides the connection to the public fixed networks.

One of the four intelligent databases included in the Network Subsystem is the Home Location Register (HLR), which contains all the administrative information of each subscriber registered in the corresponding GSM network, along with the current location of the subscriber. There is logically one HLR per GSM network, although it may be implemented as a distributed database. The second intelligent database is the Visitor Location Register (VLR). The VLR contains selected administrative information7 from the HLR, for each mobile subscriber currently located in the geographical area controlled by the VLR, which is necessary for call control and stipulation of the subscribed services.

The other two intelligent databases are used for authentication and security purposes. One of them is the Equipment Identity Register (EIR), which contains a list of all valid mobile equipment on the network, where each mobile equipment is identified by its International Mobile Equipment Identity (IMEI). An IMEI is marked invalid if it has been reported stolen or is not type approved. The other intelligent database is the Authentication Center (AuC), which is a protected database that stores a copy of the secret key stored in each subscriber's SIM card.

The available GSM radio spectrum is divided into 200 kHz carrier frequencies using FDMA (Frequency Division Multiple Access). One or more carrier frequencies are assigned to individual base stations, where each carrier is divided into eight time slots using TDMA (Time Division Multiple Access) and where eight consecutive time slots form TDMA frames. A transmission channel occupies one time slot within a TDMA frame. TDMA frames of a particular carrier frequency are numbered, and both the mobile station and the base station are synchronized on this number. Larger frames are formed from larger groups of TDMA frames. The position within such frames defines the type and function of a channel.

Common channels can be accessed both by idle mode mobiles in order to change to dedicated mode, and by dedicated mode mobiles to monitor surrounding base stations for handover information. The common channels include:

BCCH (Broadcast Control Channel), which continually broadcasts, on the downlink, the information such as the base station identity, frequency allocations, and frequency-hopping sequences.

FCCH (Frequency Correction Channel) and SCH (Synchronization Channel), which synchronize the mobile to the time slot structure of a cell by defining the beginning of a TDMA frame.

RACH (Random Access Channel), which is used by the mobile to request access to the network.

PCH (Paging Channel), which alerts the mobile station of an incoming call.

AGCH (Access Grant Channel), which allocates an SDCCH (Stand-alone Dedicated Control Channel) to a mobile for signaling (in order to obtain a dedicated channel), following a request on the RACH.

Each PCH block message is composed of four transmission "bursts." A PCH message is scattered among the four bursts as a result of the fire coding, the convolutional coding, the interleaving, and the mapping process, all prior to transmission of the message. FIG. 1 is a block diagram depicting these processes. If a PCH message is a dummy one, there is no need for a handset to turn on and analyze its four carrier bursts; however, the handset needs to make a determination as to whether the PCH message is a dummy one before deciding not to receive the rest of it. Therefore, a handset saves power if it can quickly make such a determination and ignore the remainder of a dummy PCH block.

BRIEF DESCRIPTION OF THE DRAWINGS

The foregoing aspects and many of the attendant advantages of the invention will become more readily appreciated as the same become better understood by reference to the following detailed description, when taken in conjunction with the accompanying drawings, wherein:

FIGS. 3, 4, and 5 present message contents of Paging Request Types 1, 2, and 3, respectively.

FIG. 6 illustrates coding details of a Mobile Identity information element.

FIGS. 7, 8, and 9 depict P1, P2, and P3 Rest Octets information elements, respectively.

FIG. 10 presents message contents of a dummy PCH block.

FIG. 11 presents possible compositions of b1 and b2 vectors.

DETAILED DESCRIPTION

In the following description, several specific details are presented to provide a thorough understanding of the embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
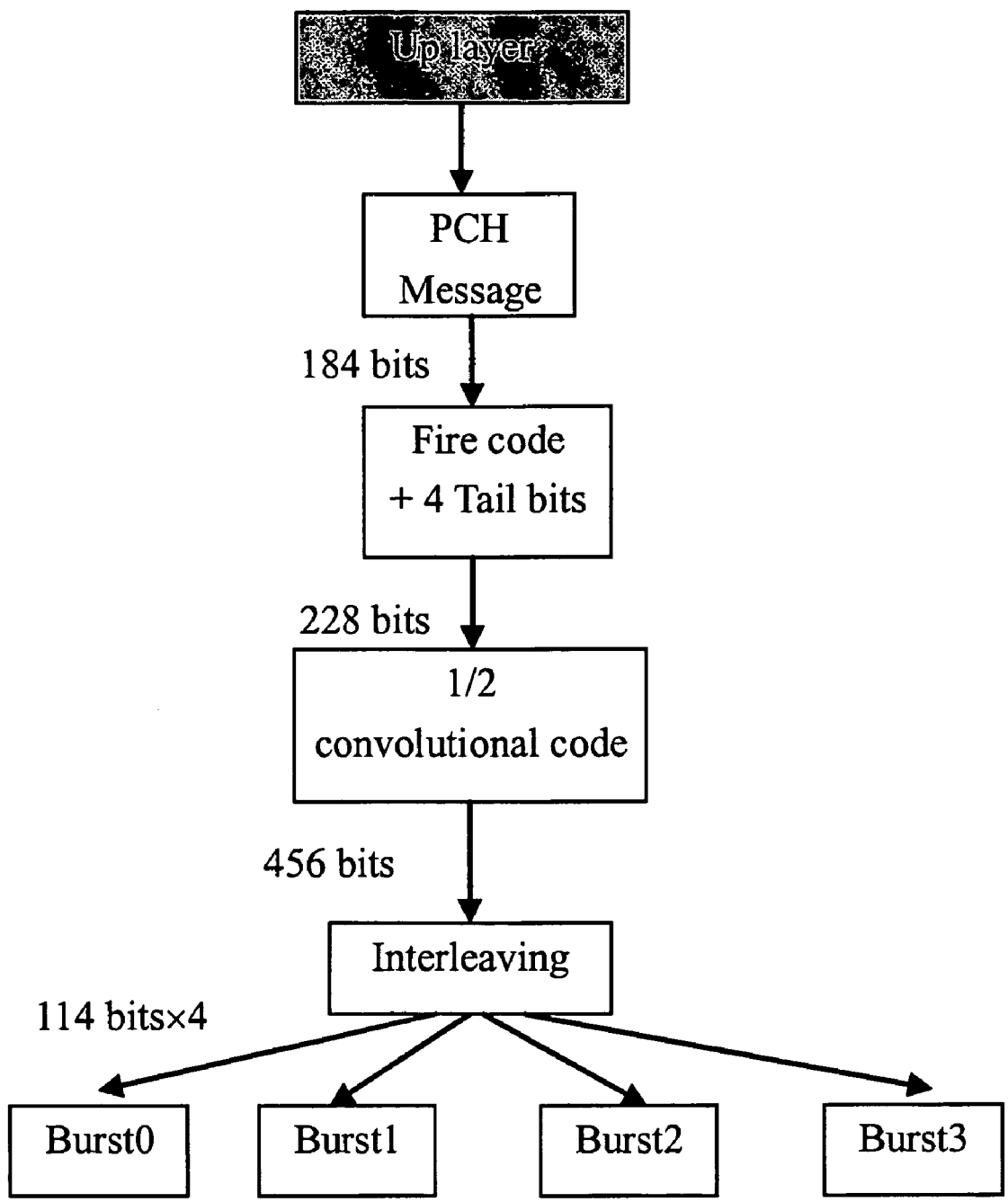
FIG. 1 is a block diagram of processes performed on a PCH message before its radio transmission.
Figure 2:
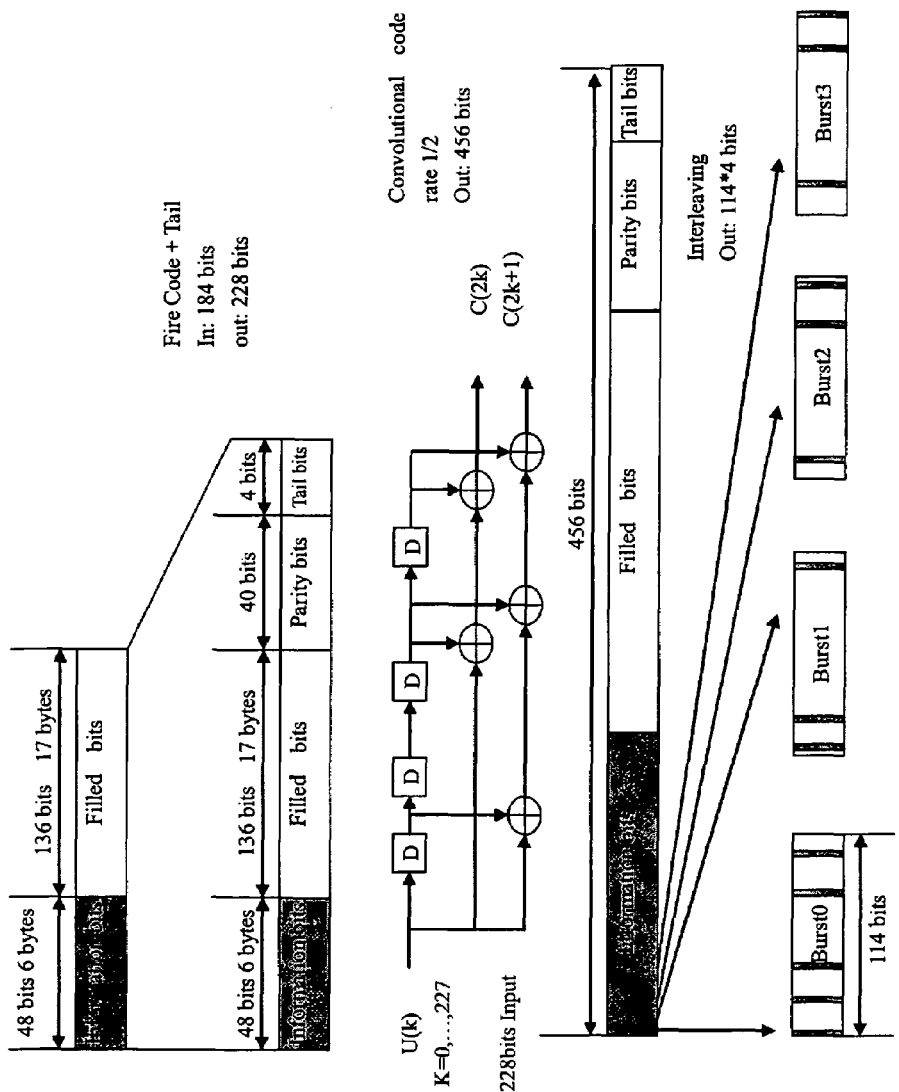
FIG. 2 is a depiction of the details of the processes enumerated in FIG. 1.

The concepts of this invention relate generally to wireless digital communication systems and, in particular, to power-saving techniques for GSM technology. One of the common channels of the GSM system is the Paging Channel (PCH) for alerting the mobile station of an incoming call. Each PCH block message is composed of four bursts, and, as illustrated in FIG. 1, the PCH message is scattered among all four bursts as a result of the fire coding, the convolutional coding, the interleaving, and the mapping process, all prior to the transmission of the message. FIG. 2 depicts the details of the evolution of a PCH message into four bursts. The shaded areas represent the useful information bits.

In normal conditions, a GSM handset should read the PCH block message of the paging channel in every paging interval. But if a PCH message is a dummy one, it would be a waste of power for a handset to turn on and analyze the bursts; however, the handset needs to make a determination as to whether a PCH message is a dummy one before deciding not to continue deciphering its bursts. Therefore, to save power, a handset needs to make a quick determination and turn off the power if PCH message is a dummy one.

The content and structure of a typical PCH block message are explained below. Embodiments of this invention include methods and apparatus for enabling a handset to assess whether a PCH message is a dummy one, by merely analyzing the first received burst. This affords a handset to turn off after the evaluation of the first burst, if the message is a dummy one. Since most of the PCH messages are dummy ones, the proposed methods will cause noticeable savings in the power consumption of the GSM handsets.

The terminology used in the description presented here is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this "Detailed Description" section.

Reference throughout the specification to "one embodiment" or "an embodiment" means that a particular feature, structure, implementation, or characteristic described in connection with the embodiment is included in at least one embodiment of the present invention. Thus, the phrases "in one embodiment" and "in an embodiment" in various places throughout the specification do not necessarily all refer to the same embodiment. Furthermore, the particular features, structures, implementations, or characteristics may be combined in any suitable manner in one or more embodiments. In general, there are 23 bytes, or 184 bits, in every PCH block of information. Here, they are indexed 0 to 22. There are also three kinds of PCH blocks in a GSM system, which are termed Paging Request Types 1, 2, and 3. The message contents of the Paging Request Types 1 through 3 are shown in FIGS. 3, 4, and 5.

The purpose of the Mobile Identity information element is to provide the International Mobile Subscriber Identity (IMSI), the Temporary Mobile Subscriber Identity (TMSI), or the International Mobile Equipment Identity (IMEI). The Mobile Identity information element is coded as shown in FIG. 6. The Mobile Identity is an information element with a minimum length of 3 octets and a maximum length of 10 octets. The TMSI is 4 octets long, the IMEI is 15 digits long, and the IMSI shall not exceed 15 digits. For all transactions except emergency call establishment, emergency call re-establishment, mobile terminated call establishment, identification procedure, and ciphering mode setting procedure, the mobile station and the network shall select the mobile identity type according to the following priority:

1-TMSI: The TMSI shall be used if it is available.

2-IMSI: The IMSI shall be used in cases where no TMSI is available.

The P1 Rest Octet information element is an information element 0–17 octets long, shown in FIG. 7. The P2 Rest Octet information element is a type 5 information element 1–11 octets long, shown in FIG. 8. The P3 Rest Octet information element is an information element 3 octets long, shown in FIG. 9.

In general, there is no MT (Mobile Terminated—a term given to all communications that terminate at the mobile phone) in a paging group. In such a case the PCH block is called a dummy PCH block. Dummy PCH blocks belong to Paging Request Type 1 and have. important characteristics as explained below. FIG. 10 presents the message content of a dummy PCH block. If a PCH block is a dummy one, the useful content of its message is only 6 bytes (48 bits) and, the remaining 17 bytes (136 bits) are filled with 2B (0010 1011), as depicted in FIG. 10. The byte with idex 3 is the "Page Mode," which is referred to by a hexadecimal digit 'M'. There are four kinds of Page Mode: 0, 1, 2, and 3.

In FIG. 10, the byte with idex 5 is octet 3 of the mobile identity. Its bits 5 through 8 are the identity digit 1, which is referred to by a hexadecimal digit 'F'. In a dummy PCH message, 'F' can have two values, [0 0 0 0] or [1 1 1 1]. According to GSM Specifications, 'F' can be ignored by the mobile station but 'M' should be detected. If 'M' is 0, the dummy PCH block can be ignored and the mobile station need not do anything at all; otherwise, the mobile station must receive and decode the entire PCH block.

Most of the time in practice, the base station transmits dummy PCH blocks to the mobile station, where 'M' is 0 (the Page Mode is 0). And if this situation can be detected merely by analyzing the first burst, the remaining three bursts need not be received at all. Such a capability will noticeably reduce the power consumption of a mobile station.

During the preparation of a dummy PCH message for radio transmission, after interleaving, the 456 bits will be split into four 114-bit bursts. The first dummy burst, hereinafter called Burst0, may also be referred to as the row vector Burst0(n), where n=0, 1, 2, . . . , 113. Using the elements of Burst0(n), two other row vectors, a and b, are formed where:

a=Burst0(0,1,2,3,4,5,6,8,9,10,13,15,17,18,19,20,22,
23,24,25,27,29,31,32,33,34, 36,37,38,39,41,43,
44,45,46,47,48,50,51,52,53,54,55,57,58,59,60,
61,62,64,66,67, 68,69,71,72,73,75,76,78,80,81,
82,83,85,86,87,88,89,90,92,94,95,96,97,99,100,
101,102,103,104,105,106,108,109,110,111,113)   Equation 1 and b=Burst0(7,11,12,14,16,21,26,28,30,35,40,42,49,56,
63,65,70,74,77,79,84,91,93, 98,107,112).   Equation 2

Theoretically, the 88 bit long vector a should have the following composition:

a1=[1 0 1 0 0 0 0 0 1 0 1 1 1 0 1 0 0 1 0 0 0 0 0 0
0 0 0 1 0 0 1 1 1 1 0 1 0 0 1 0 0 0 0 0 1 0 1 0
0 0 0 0 0 1 1 1 1 1 0 0 0 0 0 0 0 1 0 0 0 0 0 0
0 0 1 1 0 1 1 1 0 1 0 0 0 0 0 0 0], and the 26 bit long vector b will have one of the following two possible compositions, when 'M' is 0:

b1=[0 0 1 0 0 0 0 0 1 0 0 0 1 1 0 1 1 0 1 1 0 1 0 1 0 0], and b2=[0 1 1 1 0 1 0 1 1 0 1 0 0 0 0 0 0 1 1 0 0 0 0 0 0 1].

FIG. 11 presents the possible binary compositions of the b1 and b2 vectors corresponding to all possible values of 'M'. The 88-bit long vector a1 and the 26-bit long vectors b1 and b2 are kept in a handset memory to be utilized for comparison purposes by the dummy block detection algorithms each time the handset receives the first burst of a PCH message block. In this disclosure, for the detection of a dummy block, two sample decision algorithms are introduced—the Hard Decision algorithm and the Soft Decision algorithm.

In one embodiment of the invention the proposed Hard Decision algorithm analyzes the first received burst of a PCH block to detect a possible dummy block. At the first stage of the algorithm, the 114 values of the sampled and quantized (or digitized) burst are replaced by '1's and '0's. If the 114 elements of the first burst, referred to as RBurst0(n) vector, are N-bit quantized and vary from $(-2^{N-1})$ to $(-2^{N-1}-1)$ after a Viterbi Equalizer, a '1' will replace any negative element and a '0' will replace any zero or positive element, captured below:

---
For n=0 :113
   If RBurst0(n)<0
      RBurst0(n)=1 ;
   Else
      RBurst0(n)=0 ;
   end
end
---

Figure 12:
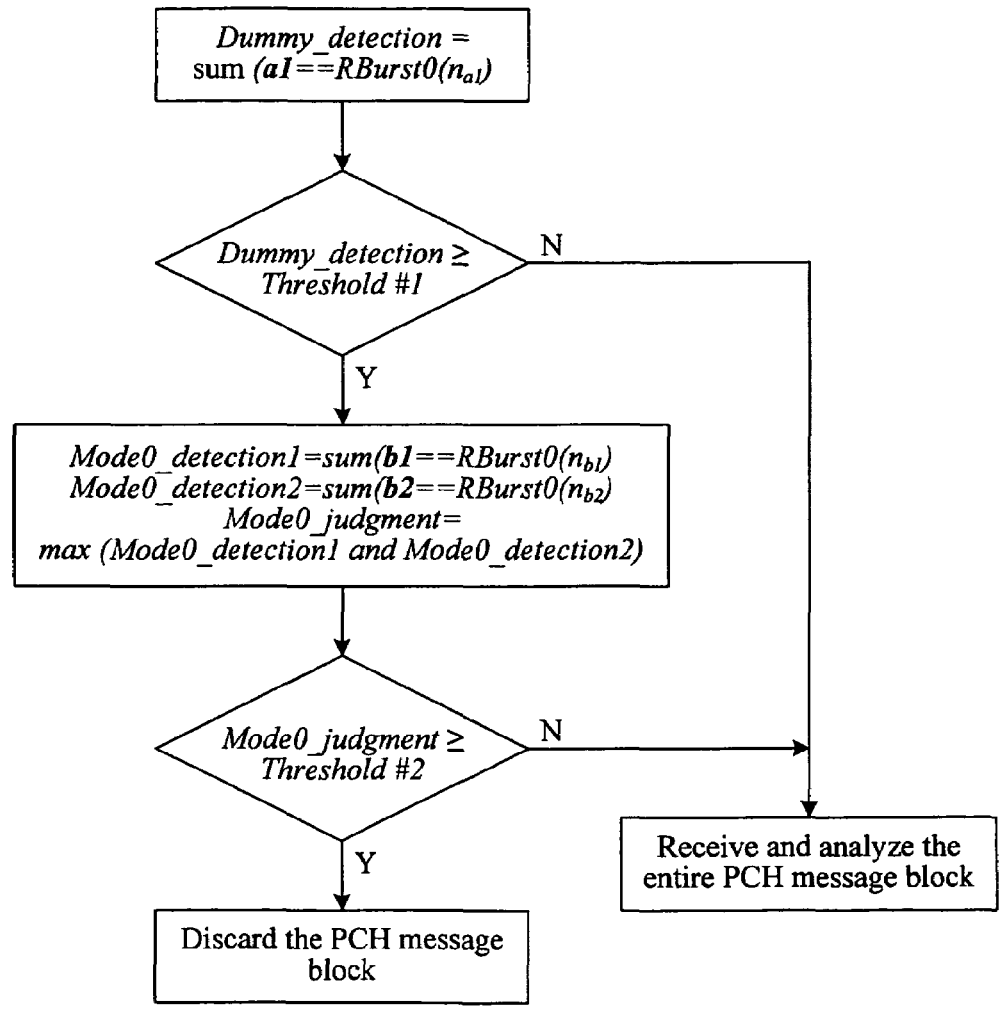
FIG. 12 is a flow diagram of a Hard Decision algorithm in accordance with an embodiment of the present invention.

Once the actual elements of the RBurst0(n) vector are replaced by '0's and '1's, the Hard Decision algorithm compares its corresponding elements with the elements of the a1, b1, and b2 vectors, which are in the handset memory, and decides the likelihood of a match according to the decision flow diagram of FIG. 12. Note that the a1, b1, and b2 vectors can either be stored in the memory as separate vectors, or as a 140-bits long (114+26+26) vector where separate portions of the 140-bits long vector is utilized during the computations. In the flow diagram of FIG. 12, sum(j==k) represents the total number of matched pairs of the two equal size vectors j and k after a bit-by-bit comparison, where the compared bits are identical.

The Hard Decision algorithm first compares the corresponding elements of the RBurst0(n) vector (elements enumerated in Equation 1) with the elements of the a1 vector and counts the number of matched pairs. If the total number of the matched pairs, called Dummy_detection, is less than a certain threshold, which is discussed later, the RBurst0 does not belong to a dummy PCH block, and the handset must receive and decode the remaining three bursts. But if the Dummy_detection is equal to or greater than the said threshold, the RBurst0 belongs to a dummy PCH block, but the algorithm must continue the analysis to find out whether the Page Mode is '0'.

To find out whether the Page Mode is '0', the Hard Decision algorithm compares the corresponding RBurst0(n) vector elements (elements enumerated in Equation 2) with the elements of the b1 and the b2 vectors and finds the total number of matched pairs in each case. If the larger of the two numbers, called Mode0_judgement, is equal to or greater than a second threshold value, which will also be discussed later, the Page Mode is '0' and there is no need for the handset to receive and decode the remaining three bursts. But if Mode0_judgement is less than the said second threshold value, the Page Mode is not '0' and the handset should receive and decode the remaining three bursts.

In another embodiment of the invention, the Soft Decision algorithm analyzes the first received burst of a PCH block to detect a possible dummy block, where the 114 values of the sampled and digitized burst, referred to as RBurst0(n) vector, are N-bit quantized and vary from $-2^{N-1}$ to $2^{N-1}-1$ after a Viterbi Equalizer. At the first stage of the Soft Decision algorithm, β, which is the mean of the absolute values of the RBurst0(n) elements, is calculated as a part of the computation of threshold values utilized by the Soft Decision algorithm, where:

$$\beta = \frac{1}{114}\sum_{n=0}^{113}|RBurst(n)|$$

After the threshold values are computed in accordance with the entries of Table 1, utilizing β, the Soft Decision algorithm revises the a1, b1, and b2 vectors as follows:

SD_a1(n)=1−2a1(n); for n=0, 1, 2, . . . , 88
SD_b1(n)=1−2b1(n); for n=0, 1, 2, . . . , 26
SD_b2(n)=1−2b2(n); for n=0, 1, 2, . . . , 26

Subsequently, the algorithm computes the following values as the basis for its final decision:

$$\text{Dummy\_detection} = \sum_{n=1}^{88} Ra(n)^* SD\_a1(n);$$

-continued $$\text{Mode0\_detection1} = \sum_{n=1}^{26} Rb(n)^* SD\_b1(n);$$

$$\text{Mode0\_detection2} = \sum_{n=1}^{26} Rb(n)^* SD\_b2(n);$$

Figure 13:
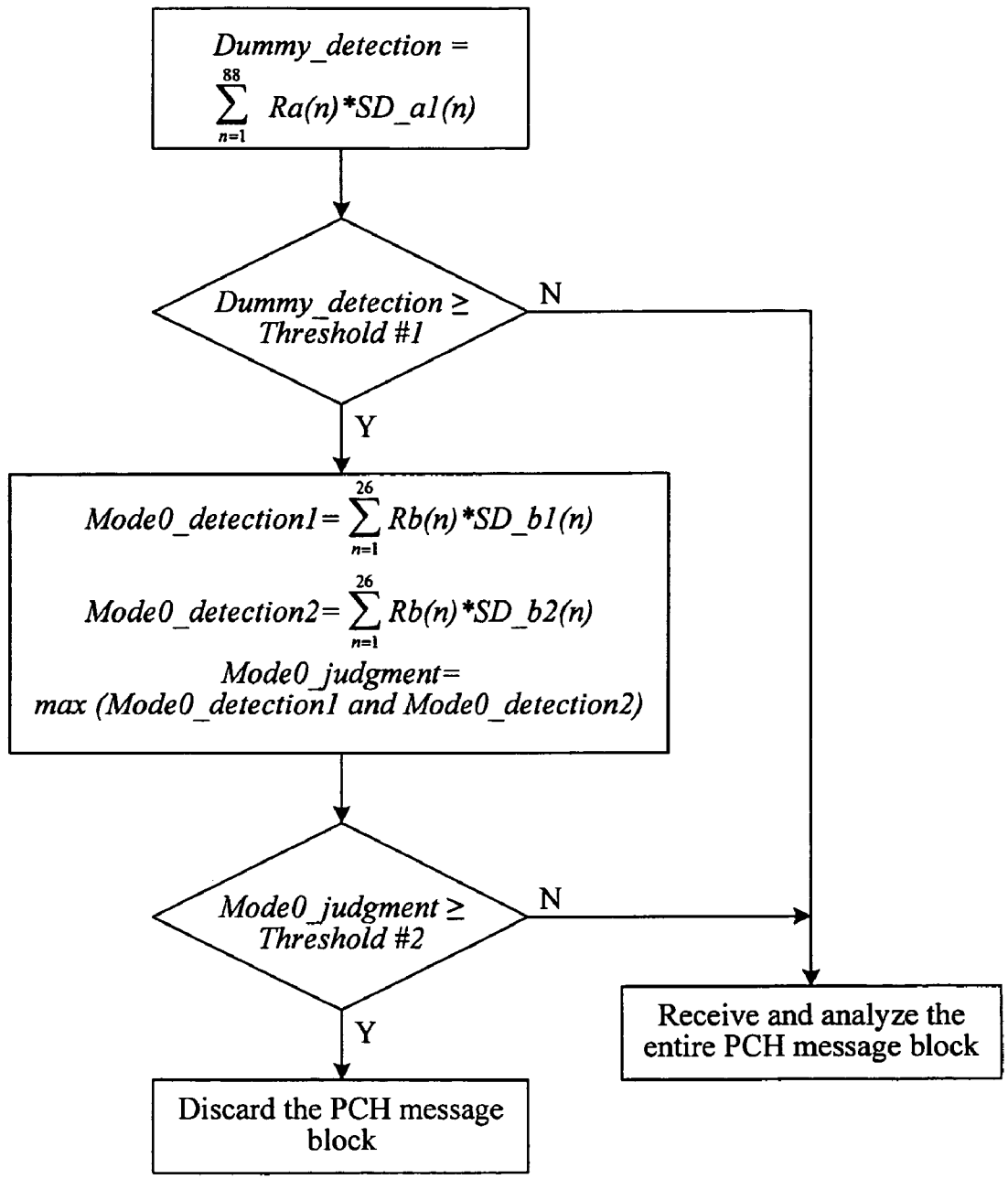
FIG. 13 is a flow diagram of a Soft Decision algorithm in accordance with another embodiment of the present invention.

Mode0_judgement = max(Mode0_detection1 and Mode0_detection2), where Ra and Rb are formed using the elements of RBurst0 vector, in accordance with the compositions specified in Equation 1 and Equation 2. Once the decision-making variables are computed, the Soft Decision algorithm decides whether the received burst belongs to a dummy PCH block. The decision-making process of the Soft Decision algorithm is captured in the decision flow diagram of FIG. 13.

The Soft Decision algorithm first compares the value of the Dummy_detection with a first threshold value, depicted in Table 1. If the Dummy_detection is smaller than the said first threshold value, the PCH block is not a dummy block and the remaining three bursts should be received and decoded. But if the Dummy_detection is greater than or equal to the said first threshold value, the PCH block is a dummy block; however, the algorithm needs to continue the analysis and find out whether the Page Mode is '0'.

To find out whether the Page Mode is '0', the Mode0_judgement is compared with a second threshold value, also depicted in Table 1. At this point of the analysis, if the Mode0_judgement is larger than or equal to the said second threshold value, the Page Mode is '0' and there is no need to receive and decode the remaining three PCH bursts. But if the Mode0_judgement is smaller than the said second threshold value, the Page Mode is not '0' and the remaining three bursts must be received and decoded.

The sample threshold values utilized in the above two embodiments of this invention are depicted in Table 1 and have been produced by computer simulations and field trials in China Mobile Communications Corporation real networks.

TABLE 1

| Algorithm | Dummy_detection Threshold | Mode0_judgement Threshold |
|---|---|---|
| Hard Decision | 74 | 21 |
| Soft Decision | 70*β | 15*β |

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the "Detailed Description" section using the singular or plural number may also include the plural or singular number, respectively. When the claims use the word "or" in reference to a list of two or more items, that word covers all of the following interpretations of the word: any of the items in the list, all of the items in the list, and any combination of the items in the list.

Figure 14:
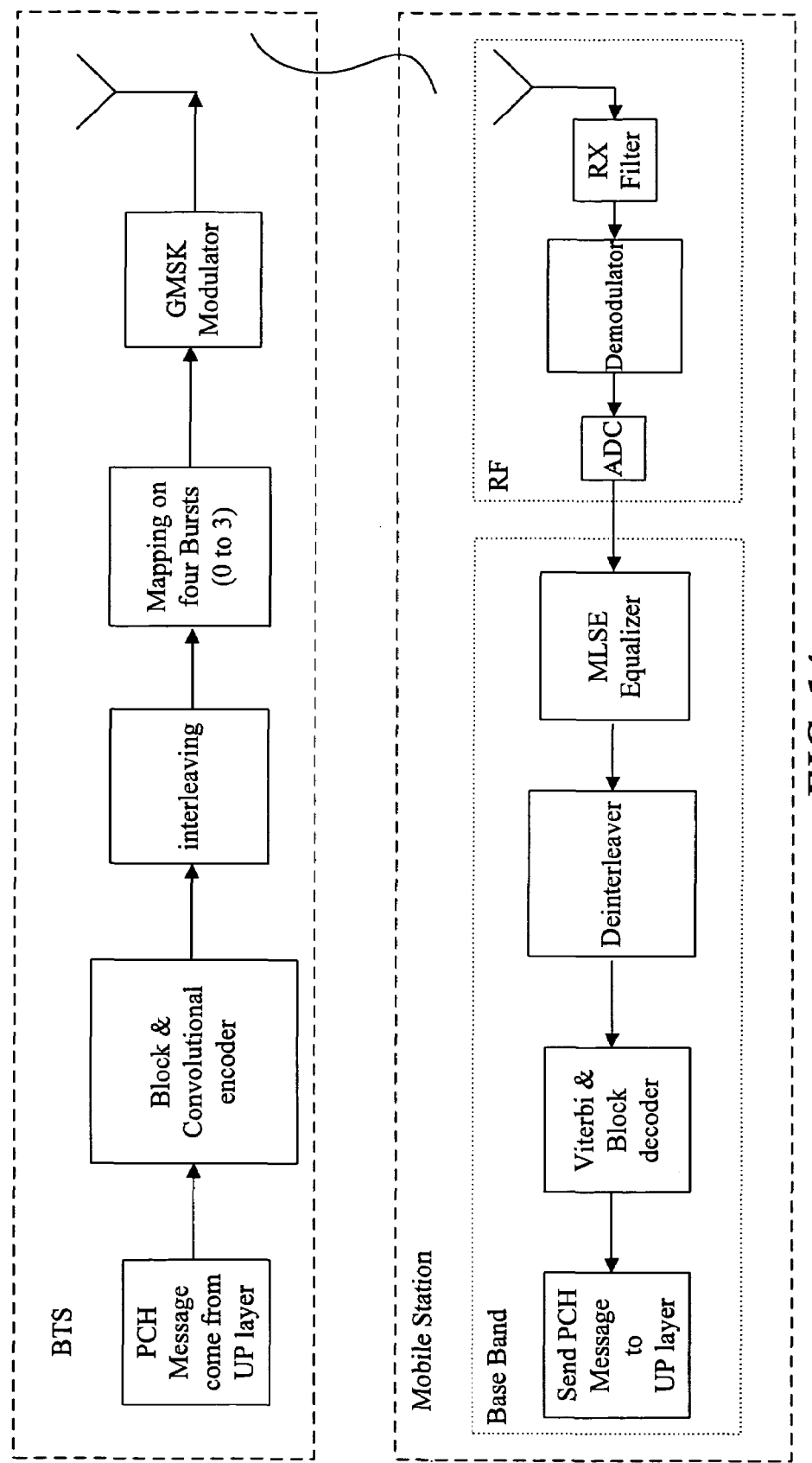
FIG. 14 is a block diagram of typical processes involved in a traditional mobile communication system when a signal is manipulated and transmitted by a Base Station and received by a Mobile Station.
Figure 15:
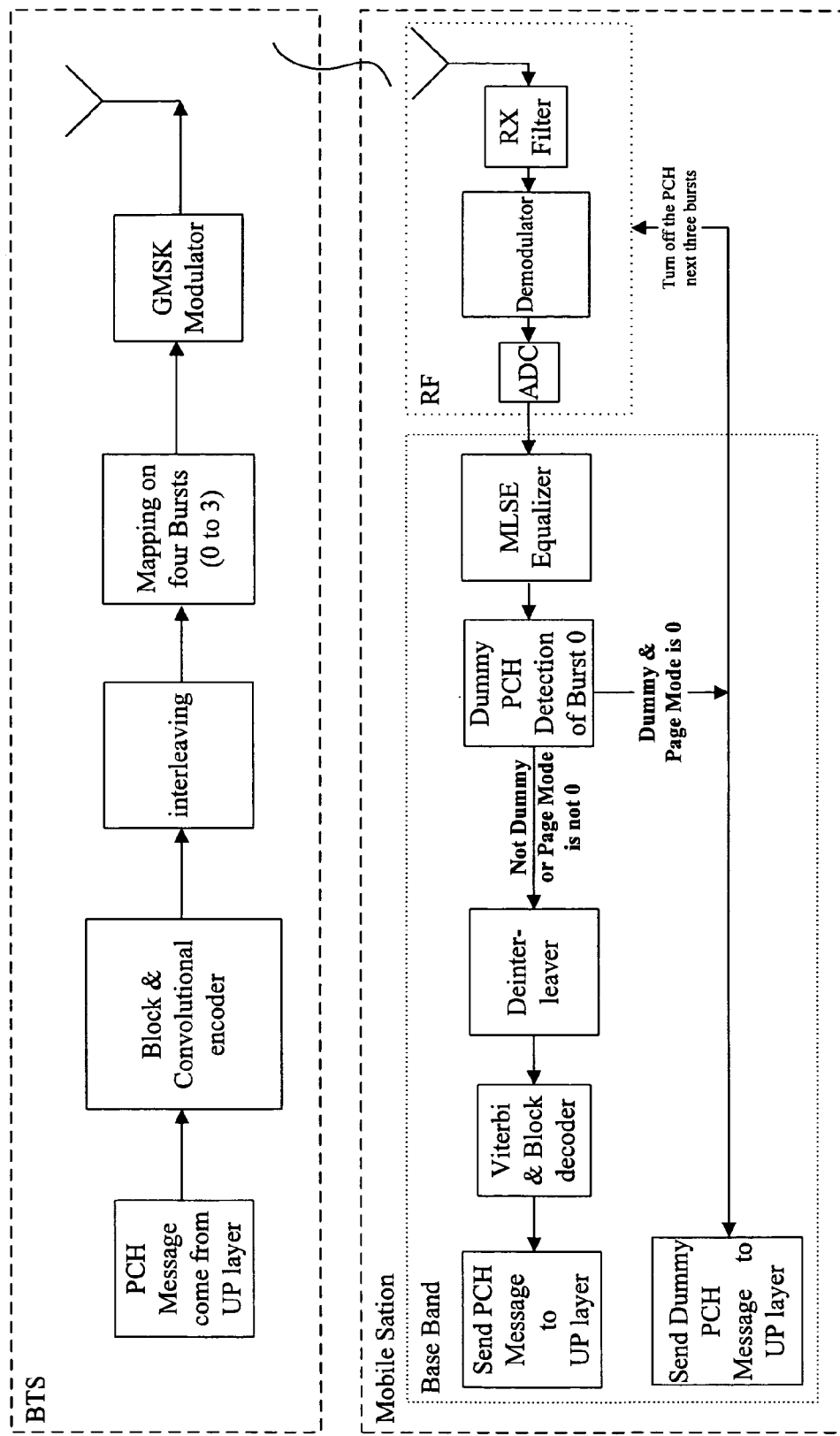
FIG. 15 is a block diagram of a mobile communication system illustrating processes involved in manipulation and transmission of a signal by a Base Station and its reception by a Mobile Station, in accordance with an embodiment of the present invention.

A comparison of FIGS. 14 and 15 reveals some of the improvements made by different aspects of this invention to the traditional mobile communication processes when a signal is manipulated and transmitted by a Base Station and received by a Mobile Station. FIG. 14 is a block diagram of typical processes involved in a traditional system, whereas FIG. 15 is a block diagram of the new set of processes in accordance with an embodiment of the present invention.

As part of the traditional processes of a mobile communication system, depicted in FIG. 14, the PCH message is encoded, interleaved, and mapped into four bursts before being modulated for RF transmission from the Base Station. The modulation example presented in FIG. 14 is a Gaussian Minimum Shift Keying (GMSK) modulation. After this RF transmitted signal is received by a mobile station, it is filtered, demodulated, sampled, and digitized into its baseband before being cleaned up, deinterleaved, and decoded into the PCH message again. As it is easily observed from FIG. 14, there are no provisions in the traditional system to predict that a PCH message is a dummy one until the entire process is exhausted.

As illustrated in FIG. 15, the processes performed at a Base Station for the transmission of a PCH message are identical to the traditional processes; however, the processes involved after reception of the RF signal at the mobile station are somewhat different as described below. In the embodiment of the invention depicted in FIG. 15, the received RF signal is filtered, demodulated, sampled, and digitized into its baseband and passed to an MLSE equalizer (maximum-likelihood sequence estimator) as in a typical system. But the output of the equalizer is not decoded before determining whether the PCH message is a dummy one, which is performed using only the first burst of the four bursts. And if the message is predicted to be a dummy one, the RF will be turned off for the duration of the next three bursts and a message is sent to the UP-layer announcing the detection of a dummy PCH message.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily to the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless this "Detailed Description" section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A GSM (Global System for Mobile Communication) handset capable of deciding whether to analyze an entirety of a Paging Channel (PCH) message, by analyzing a first burst of the PCH message block, the handset comprising:
 a memory space for storing a first binary reference-vector, a second binary reference-vector, and a third binary reference-vector;
 a receiving facility for receiving the first burst of the PCH message block;
 a sampler for sampling and quantizing the first received burst into a plurality of data points;
 a processor for creating a first and a second binary received-vector whose every individual bit relates to one individual data point of the first burst;
 a processing facility for comparing bits of the first received-vector with the related bits of the first reference-vector, and related bits of the second received-vector with the bits of the second and the third reference-vectors;
 a computing element for computing a total number of matched pairs for each of the three vector comparisons, wherein the two compared bits of a matched pair are the same;
 a decision-making element for deciding that the handset should analyze the entire PCH message block, if the total number of the matched pairs of the first vector comparison is less than a first threshold value;
 a decision-making element for deciding that the handset need not consider the rest of the PCH message block, if the total number of the matched pairs of the first vector comparison is equal to or more than the first threshold value and the total number of the matched pairs of at least one of the other two vector comparisons is equal to or more than a second threshold value; and
 a decision-making element for deciding that the handset should consider the rest of the PCH message block, if the total number of the matched pairs of the first vector comparison is equal to or more than the first threshold value and the total number of the matched pairs of each of the other two vector comparisons is less than the second threshold value.

2. The handset of claim 1, wherein the first reference-vector is [1 0 1 0 0 0 0 0 1 0 1 1 1 0 1 0 0 1 0 0 0 0 0 0 0 0 1 0 0 1 1 1 1 0 1 0 0 1 0 0 0 0 0 1 0 1 0 0 0 0 0 0 1 1 1 1 1 0 0 0 0 0 0 0 1 0 0 0 0 0 0 0 0 1 1 0 1 1 1 0 1 0 0 0 0 0 0], the second reference-vector is [0 0 1 0 0 0 0 0 1 0 0 0 1 1 0 1 1 0 1 1 0 1 0 1 0 0], and the third reference-vector is [0 1 1 1 0 1 0 1 1 0 1 0 0 0 0 0 0 1 1 0 0 0 0 0 0 1].

3. The handset of claim 1, wherein the first burst is sampled into 114 data points, and the data points are indexed 0 to 113, and wherein the bits of the first received-vector relate to these data points in the following order:
 (0,1,2,3,4,5,6,8,9,10,13,15,17,18,19,20,22,23,24,25,27, 29,31,32,33,34,36,37,38,39,41,43,44,45,46,47,48,50, 51,52,53,54,55,57,58,59,60,61,62,64,66,67,68,69,71, 72,73, 75,76,78,80,81,82,83,85,86,87,88,89,90,92,94, 95,96,97,99,100,101,102,103,104,105,106,108,109, 110,111,113),
 and wherein the bits of the second received-vector relate to the remaining data points of the first burst in the follow order:
 (7,11,12,14,16,21,26,28,30,35,40,42,49,56,63,65,70,74, 77,79,84,91,93,98,107, 112).

4. In a Global System for Mobile Communication (GSM), a method of detecting a dummy Paging Channel (PCH) message through analysis of a first burst of the PCH message block, the method comprising:
 storing at least one reference-vector having binary elements;
 receiving the first burst of the PCH message block;
 sampling and quantizing the received burst;
 creating at least one received-vector whose binary elements correspond to the values of the quantized data;
 comparing, bit-by-bit, a plurality of the binary elements of the at least one received-vector with corresponding binary elements of the at least one reference-vector;
 computing at least one total number of matched pairs, wherein the two compared bits in a matched pair are identical; and
 deciding whether the PCH message block is a dummy one, by comparing the computed at least one total number of the matched pairs with at least one threshold value;
 wherein three reference-vectors are stored in at least one handset memory, and wherein a first element group of the received-vector is compared to one of the stored reference-vectors and a second element group of the received-vector is compared to two remaining reference-vectors, and wherein if the total number of the matched pairs of the comparison of the first element group is less than a first threshold value the PCH message is not a dummy one, and if the total number of the matched pairs of the comparison of the first group is more than or equal to the said first threshold value, the PCH message is a dummy one but the handset can only ignore the other remaining PCH bursts if at least one of the total number of the matched pairs of the two comparisons of the second element group is more than a second threshold value;
 and wherein the bits of the second received-vector correspond to the data points of the first burst in the following order: (7,11,12,14,16,21,26,28,30,35,40,42, 49,56,63,65,70,74,77,79,84,91,93,98,107,112).

5. The method of claim 4, wherein the PCH message block has four bursts and the first burst is sampled and quantized into 114 data points.

6. The method of claim 4, wherein three reference-vectors are stored in the handset memory.

7. The method of claim 4, wherein a '1' in the received-vector corresponds to a negative data point and a '0' corresponds to a zero or a positive data point.

8. The method of claim 4, wherein a threshold value is obtained either by computer simulation or empirically.

9. The method of claim 4, wherein three reference-vectors are stored in a handset memory, and wherein a first element group of the received-vector is compared to one of the stored reference-vectors and a second element group of the received-vector is compared to two remaining reference-vectors stored in the handset.

10. In a Global System for Mobile Communication (GSM), a process of determining whether to ignore a Paging Channel (PCH) message through analysis of a first burst of the PCH message block, the process comprising:

- a step of storing a first, a second, and a third reference-vector having binary elements, in at least one handset memory;
- a step of receiving the first burst of the PCH message block;
- a step of sampling and quantizing the received burst;
- a step of creating at least one received-vector employing the elements of the quantized data;
- a step of multiplying each element of the first reference-vector by the corresponding element of the received-vector and adding them together to form a dummy-detection-value;
- a step of multiplying each element of the second reference-vector by the corresponding element of the received-vector and adding them together to form a first mode0-detection-value;
- a step of multiplying each element of the third reference-vector by the corresponding element of the received-vector and adding them together to form a second mode0-detection-value;
- a step of computing a first and a second threshold value utilizing the average of the absolute values of the quantized data; and
- a step of deciding that:
  - the handset needs to analyze the rest of the PCH bursts if the dummy-detection-value is less than the first computed threshold value;
  - the handset need not consider the rest of the PCH bursts if the dummy-detection-value is equal to or more than the said first threshold value and either one of the first mode0-detection-value or the second mode0-detection-value is equal to or more than the second threshold value; and
  - the handset needs to consider the rest of the PCH bursts if the dummy-detection-value is equal to or more than the said first threshold value and both of the first mode0-detection-value and the second mode0-detection-value are less than the second threshold value.

11. The process of claim 10, wherein the first reference-vector is [−1 1 −1 1 1 1 1 1 −1 1 −1 −1 −1 1 −1 1 1 −1 1 1 1 1 1 1 1 1 −1 1 1 −1 −1 −1 −1 1 1 −1 1 1 −1 1 1 1 1 1 −1 1 −1 1 1 1 1 1 1 −1 −1 −1 −1 −1 1 1 1 1 1 1 1 −1 1 1 1 1 1 1 1 −1 −1 1 −1 −1 −1 1 −1 1 1 1 1 1 1 1], the second reference-vector is [1 1 −1 1 1 1 1 1 −1 1 1 1 −1 −1 1 1 −1 −1 1 −1 −1 1 1 −1 1 1 1 1], and the third reference-vector is [1 −1 −1 −1 1 −1 1 −1 −1 1 −1 1 1 1 1 1 1 −1 −1 1 1 1 1 1 1 −1].

12. The process of claim 10, wherein the quantized data of the first burst are indexed 0 to 113, and wherein the elements of the received-vector employed in the multiplication with the elements of the first reference-vector are the following quantized data:

(0,1,2,3,4,5,6,8,9,10,13,15,17,18,19,20,22,23,24,25,27,29,31,32,33,34,36,37,38,39,41,43,44,45,46,47,48,50,51,52,53,54,55,57,58,59,60,61,62,64,66,67,68,69,71,72,73,75,76,78,80,81,82,83,85,86,87,88,89,90,92,94,95,96,97,99,100,101,102,103,104,105,106,108,109,110,111,113), and wherein the elements of the received-vector employed in the multiplication with the elements of the second and third reference-vectors are the following quantized data:

(7,11,12,14,16,21,26,28,30,35,40,42,49,56,63,65,70,74,77,79,84,91,93,98,107,112).

13. The process of claim 10, wherein the quantized data are N-bits long, and their values are between $(-2^{N-1})$ and $(2^{N-1}-1)$.

14. The process of claim 10, wherein the first and the second threshold values are multiples of the average of the absolute values of the quantized data.

* * * * *